No. 773,786. PATENTED NOV. 1, 1904.
L. J. E. COLARDEAU & J. RICHARD.
PICTURE EXHIBITOR.
APPLICATION FILED MAY 1, 1900.
NO MODEL. 3 SHEETS—SHEET 1.

WITNESSES:
Ella L. Giles
Otto Munk

INVENTORS:
Louis Joseph Emmanuel Colardeau
Jules Richard
BY Richard
ATTORNEYS

No. 773,786. PATENTED NOV. 1, 1904.
L. J. E. COLARDEAU & J. RICHARD.
PICTURE EXHIBITOR.
APPLICATION FILED MAY 1, 1900.
NO MODEL. 3 SHEETS—SHEET 2.

WITNESSES:
Ella L. Giles
Otto Munk

INVENTORS.
Louis Joseph Emmanuel Colardeau
Jules Richard
BY Richards
ATTORNEYS.

No. 773,786. Patented November 1, 1904.

UNITED STATES PATENT OFFICE.

LOUIS JOSEPH EMMANUEL COLARDEAU AND JULES RICHARD, OF PARIS, FRANCE.

PICTURE-EXHIBITOR.

SPECIFICATION forming part of Letters Patent No. 773,786, dated November 1, 1904.

Application filed May 1, 1900. Serial No. 15,073. (No model.)

*To all whom it may concern:*

Be it known that we, LOUIS JOSEPH EMMANUEL COLARDEAU, professor at the College Rollin, residing at 29 Avenue Trudaine, and JULES RICHARD, manufacturer of philosophical instruments, residing at 25 Rue Mélinge, Paris, in the Republic of France, have invented Improvements in and Relating to Picture-Exhibitors, of which the following is a full, clear, and exact description.

This invention relates to improvements in automatic apparatus for consecutively presenting to view photographic or other pictures or slides in stereoscopes, optical lanterns, and like apparatus, so as to permit the inspection of the pictures or slides of a methodically-arranged collection and the direct extraction of any desired view without changing the order in which the pictures or slides are arranged.

The invention includes the particular construction and arrangement of parts hereinafter described, and particularly pointed out in the claims.

In the accompanying drawings we have shown as an example only one form of our improved apparatus applied to a stereoscope.

Figure 1:
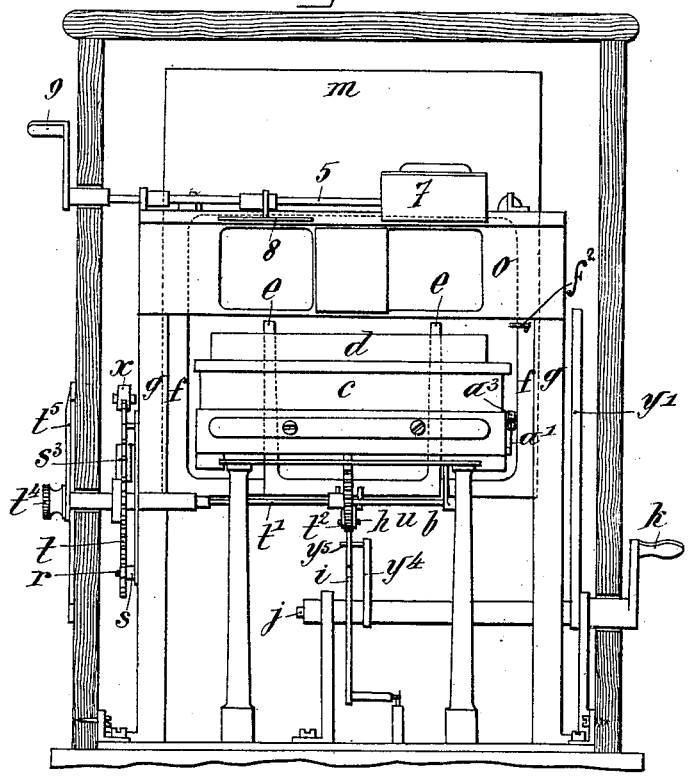
Figure 6:
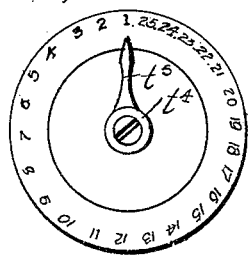
Figure 2:
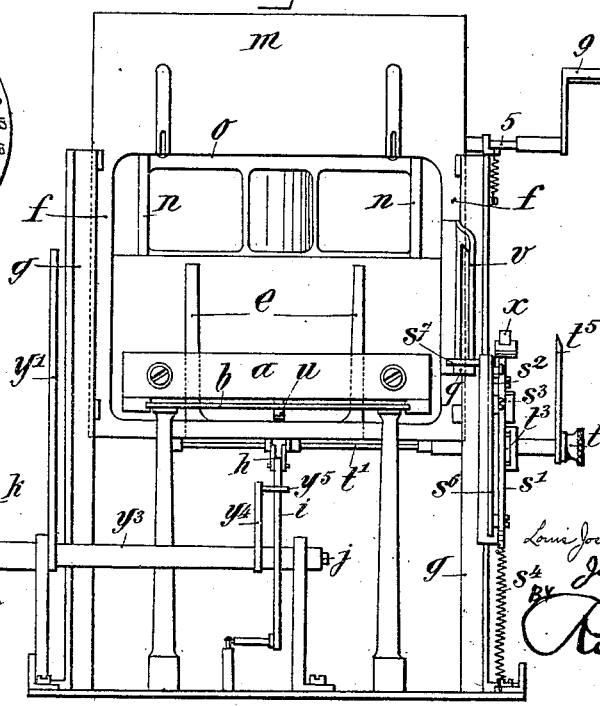
Figure 3:
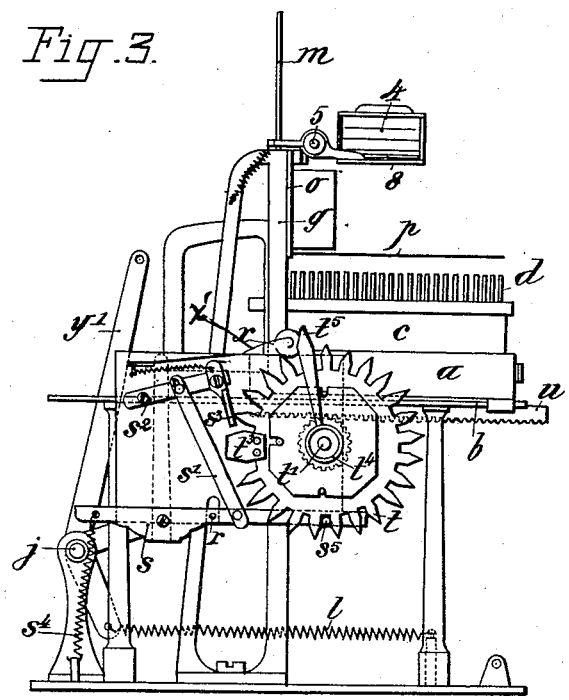
Figure 4:
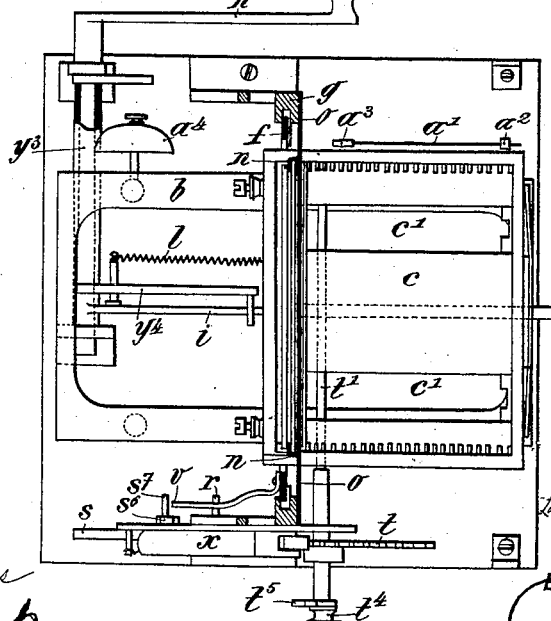
Figure 5:
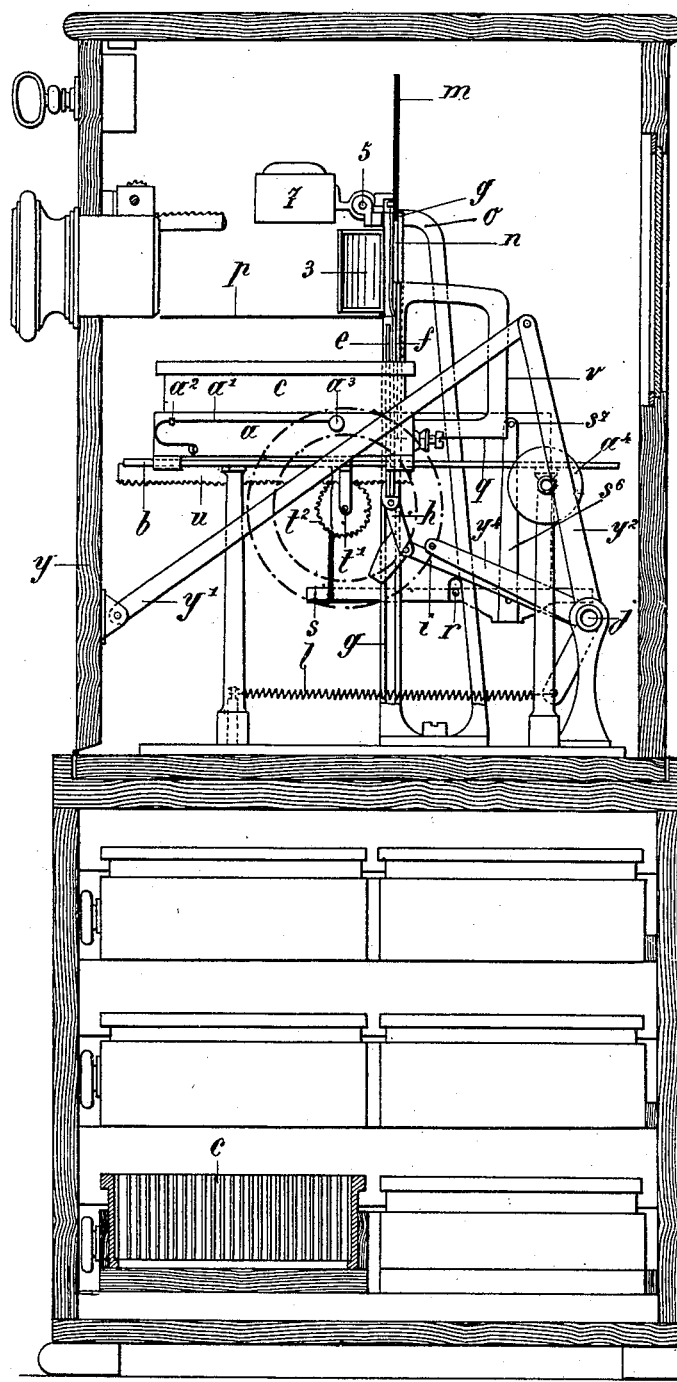

Figure 1 is a front view, Fig. 2 a rear view, and Fig. 3 a side elevation, looking from the left, of our improved automatic apparatus. Fig. 4 is a plan of the apparatus. Fig. 5 shows the apparatus applied to the inside of a stereoscope looking from the right. Fig. 6 is a detail view of the indicator.

Like letters of reference indicate corresponding parts throughout the drawings.

Our improved apparatus essentially comprises a carriage $a$, movable on a horizontal guideway $b$ and adapted to receive the box $c$, which contains, for example, a collection of photographic pictures or slides $d$ (for example, positives on glass) to be inspected. The bottom of the carriage $a$ is hollowed out, and the bottom of the box $c$ is constructed with two longitudinal openings $c'$ for the passage of the part which lifts out the picture or slide to be examined. The said picture or slide is seized at its lower part by two vertical arms $e$, supported upon the lower traverse part of a frame $f$, adapted to move vertically and guided laterally by guideways $g$. The frame $f$ is linked, by means of a small connecting-rod $h$, to the extremity of a bent lever $i$, keyed upon the controlling-axis $j$, at one end of which is mounted the operating-lever $k$. The shorter arm of the bent lever $i$ is acted upon by the restraining-spring $l$, which constantly tends to maintain the movable frame $f$ at the upper end of its path, so that the apparatus in its position of rest always supports a picture or slide in front of the optical device. The frame $f$ is prolonged at its upper part, as shown at $m$, to form a complete screen to intercept the passage of all light during the changing of the pictures or slides. The picture or slide lifted by the arms $e$ of the movable frame $f$ engages in the two vertical grooves $n$ of the fixed frame $o$, which efficiently supports the said picture or slide in the desired position. This fixed frame $o$ carries a horizontal screen $p$, adapted to cut off the luminous rays which are reflected from the lower part. The purpose of the screen is to permit the raised pictures being seen very distinctly by those viewing them, since if the screen were not used certain luminous rays would be reflected by the upper part of the pictures contained in the drawer $c$ and would arrive through the lower part of the field of view examined by the observer, who would see much less distinctly the picture brought opposite the eye-glasses of the apparatus. The movable frame $f$ is moreover provided with a bar $q$, adapted when the frame arrives at the lower end of its course and when the arms $e$ are completely disengaged from the box $c$ to operate upon the parts governing the movement of the carriage $a$. In the arrangement shown in Figs. 1 to 5 the bar $q$ is adapted to engage with the pin or projection $r$, fixed upon a lever $s$, attached, by means of a connecting-rod $s'$, to the lever $s^2$, which carries the pawl $s^3$. This pawl operates upon a ratchet-wheel $t$, keyed upon the controlling-spindle $t'$, which carries a pinion $t^2$, engaging with a rack $u$, fixed at the lower part of the carriage $a$.

In order that the carriage $a$ may not receive any movement of translation before the arms $e$ are completely disengaged from the box $c$, the lever $s$, controlled by a restraining-spring $s^4$, carries at its free extremity a pin or projection $s^5$, which engages in the spaces between two adjacent teeth of the ratchet-wheel $t$ in such a manner as to arrest the motion of the latter. Moreover, this lever is held immovable until the movable frame has reached the lower end of its path by an arm $s^6$, fixed on the lever $s$ and terminating in a pin or projection $s^7$, which is brought into contact with a stop $v$, carried by the movable frame $f$, should the lever $s$ tend to become disengaged from the ratchet-wheel $t$. When this frame arrives at the lower end of its course, the stop $v$, having also descended, no longer prevents the movement of the pin or projection $s^7$, and the lever $s$ can turn to permit the rotation of the ratchet-wheel $t$ and in consequence the movement of the carriage $a$. A roller $x$, carried by a spring-arm $x'$, restrains the ratchet-wheel $t$, so that the said wheel may always have the same angular displacement in order that the carriage $a$ can advance each time by a distance equal to the distance from center to center of two adjacent pictures or slides.

One complete revolution of the ratchet-wheel $t$ corresponds to the length of the path of the carriage $a$ when the latter has arrived at the end of its path—that is to say, when the ratchet-wheel has completed one revolution an enlarged tooth $t^3$ of the wheel $t$ is brought into engagement with the counter-pawl $x$. The enlarged tooth $t^3$ prevents any further rotation of the ratchet-wheel in the same direction, so that the movements imparted to the operating-lever $k$ have no more action on the movement of the carriage $a$ when this last has arrived at the end of its path.

The backward movement of the carriage $a$ is obtained by operating the milled button $t^4$, mounted at the extremity of the spindle $t'$, after first depressing the operating-lever $k$ to completely disengage the arms $e$ of the movable frame $f$ from the carriage $a$ and from the box $c$.

The spindle $t'$ carries a pointer $t^5$, which moves over an index or scale attached to the box of the apparatus and divided or marked to correspond to the order in which the pictures or slides contained in the box $c$ are arranged in such a manner that the particular division of the index or scale indicated by the pointer $t^5$ corresponds to the serial number of the picture or slide which is resting above or is lifted by the arm $e$ of the movable frame $f$.

In our improved apparatus when the frame $f$ has been previously completely depressed the carriage $a$ can be moved in either direction. The carriage can therefore be placed directly in the required position, so as to bring the picture or slide which it is desired to inspect into the path of the arms $e$ of the movable frame $f$. For example, if it is desired to inspect a certain picture or slide it is only necessary to press down the operating-lever $k$ to the end of its travel, so as to completely disengage the arm $e$, and to turn the milled button $t^4$ in such a manner that the pointer $t^5$ is brought in front of a division on the index or scale. By releasing the lever $k$ the movable frame $f$, under the action of the spring $l$ and the arms $e$, moves upward and lifts the picture, which thus engages and slides in the grooves $n$ of the fixed frame $o$. When the different pictures or slides of the collection are successively inspected, it is only necessary in order to pass from one to the other to depress the operating-lever $k$, which causes the movable frame $f$ to descend. In this movement the frame $f$ replaces within the box $c$ the picture or slide previously inspected. By the engagement of the bar $q$ with the lever $s$ the pin or projection $s^5$ is disengaged from the teeth of the ratchet-wheel $t$ and the pawl $s^3$ is moved so as to cause the ratchet-wheel $t$ to be advanced one tooth. The carriage $a$ is thus moved through a distance equal to the distance between the centers of two adjacent plates. By then permitting the frame $f$ to rise under the action of the spring $l$ the arms $e$ are also raised, carrying with them the succeeding picture or slide. Our improved apparatus, moreover, comprises an arrangement adapted to give a warning when the movable frame $f$ lifts the last picture or slide—that is to say, when the carriage $a$ has arrived at the end of its course. This warning apparatus consists of a spring-blade $a'$, fixed upon the carriage $a$ and provided with a small projection $a^2$, arranged to correspond in position with the last plate. The said spring-blade $a'$ carries a small hammer $a^3$, adapted to strike on a gong $a^4$ when the projection $a^2$ of the spring-blade $a'$ comes in contact with a suitable stop $f^2$, (see Fig. 1,) mounted upon the movable frame $f$. The gong is thus sounded to give a warning each time that the carriage arrives at the end of its course.

To withdraw a box containing a series of pictures or slides which have been inspected and to replace it by another box containing a new series, the side $y$ of the apparatus which carries the eyepieces is opened. This side or panel $y$ is connected, by means of a connecting-rod $y'$, to a lever $y^2$, attached to the sleeve $y^3$, operatively connected to a lever $y^4$, provided with a pin $y^5$, adapted to be brought into engagement with the controlling-lever $i$ of the frame $f$. Under these conditions the opening of the side or panel $y$ causes the frame $f$ to descend, so that any plate which happens to be lifted from the box $c$ is restored to its respective grooves in the said box, and the arms $e$ are also completely disengaged from the box.

Our improvements can be applied to stereoscopes, to optical lanterns of all kinds, and the like, and we can, if desired, modify the form, sizes, and accessory arrangements according to the different applications of our said invention.

We claim—

1. In a device of the character described, a sliding carriage for containing a plurality of pictures, means for successively raising and lowering said pictures, means for imparting to said carriage a step-by-step movement, independent means for moving said carriage to bring any desired picture in line with the raising and lowering mechanism, and indicating means for indicating the position of the pictures with relation to the raising and lowering mechanism.

2. In a device of the character described, a sliding carriage for carrying a plurality of pictures, means for successively raising and lowering such pictures and means for imparting a step-by-step movement to said carriage, comprising a rack connected to the carriage, a gear meshing with the rack, a toothed wheel connected with said gear, and a pawl operatively connected with the picture raising and lowering mechanism for acting on the teeth of said wheel, substantially as described.

3. In a device of the character described, a sliding carriage for carrying a plurality of pictures, means for successively raising and lowering such pictures and means for imparting a step-by-step movement to said carriage comprising a rack connected to the carriage, a gear meshing with the rack, a toothed wheel connected with said gear, and a pawl operatively connected with the picture raising and lowering mechanism for acting on the teeth of said wheel and a large tooth carried by said wheel adapted to render said pawl inoperative when the limit of movement of the carriage is reached, substantially as described.

4. In a device of the character described, a sliding carriage for carrying a plurality of pictures, means for successively raising and lowering such pictures and means for imparting a step-by-step movement to said carriage comprising a rack connected to the carriage, a gear meshing with the rack, a toothed wheel connected with said gear, and a pawl operatively connected with the picture raising and lowering mechanism for acting on the teeth of said wheel and a spring-pressed roller resting between the teeth of said wheel, substantially as described.

5. In a device of the character described a sliding carriage for carrying a plurality of pictures, a sliding frame for successively raising and lowering said pictures, a rock-shaft provided with a suitable handle, connections from said rock-shaft to said frame for operating the same, a rack connected to the carriage, a gear meshing with said rack, a toothed wheel connected to the gear, a pawl for engaging the toothed wheel, operating connections between the pawl and sliding-frame-operating means, a rocking lever having a pin or projection adapted to normally engage the teeth of said toothed wheel to hold the same locked, and means for rocking said lever to disengage the toothed wheel when the said frame nears the limit of its downward movement, substantially as described.

The foregoing specification of our improvements in and relating to automatic apparatus for successively presenting to view photographic or other pictures or slides in stereoscopes, optical lanterns, and the like signed by us this 20th day of April, 1900.

LOUIS JOSEPH EMMANUEL COLARDEAU.
JULES RICHARD.

Witnesses:
EDWARD P. MACLEAN,
MAURICE HENRI PIGNET.